Figure 1:
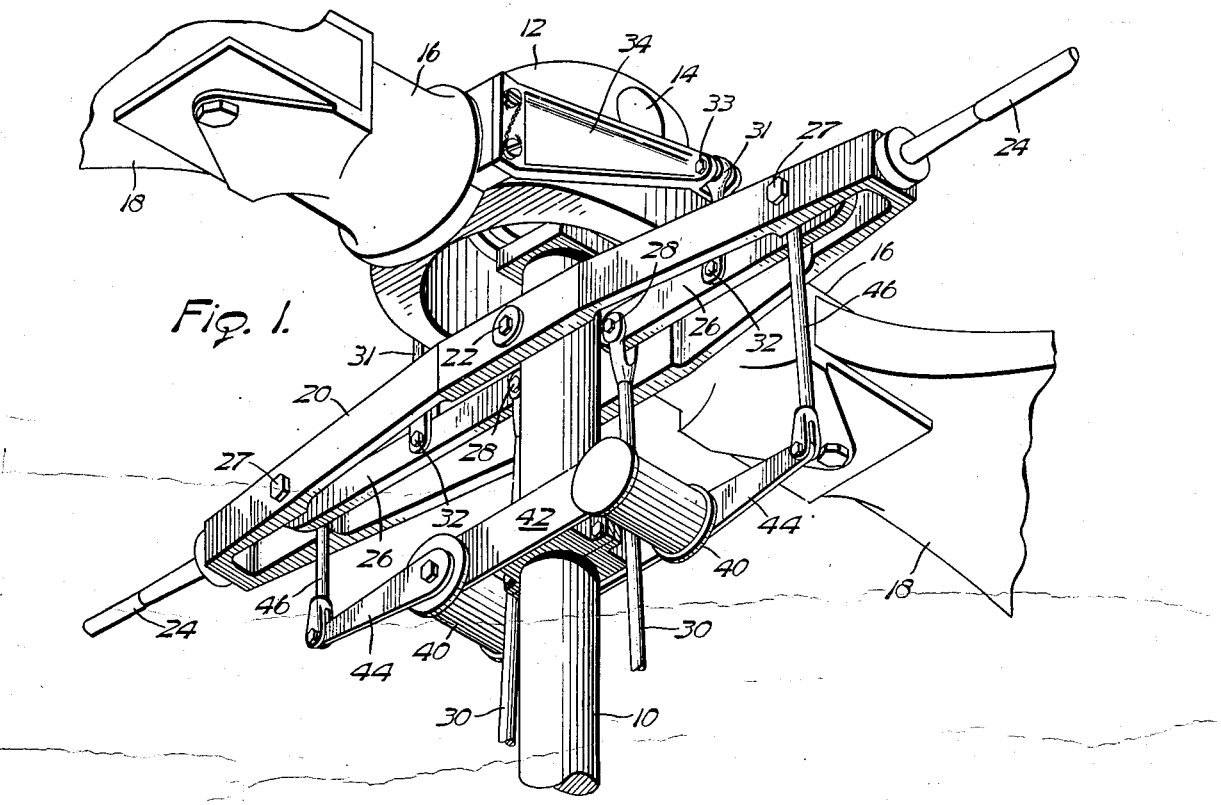

July 28, 1953   A. M. YOUNG   2,646,848
AUTOMATIC HELICOPTER ROTOR STABILIZER
Filed Feb. 18, 1947

INVENTOR
Arthur M. Young
BY
Bean, Brooks, Buckley & Bean
ATTORNEYS

Patented July 28, 1953

2,646,848

UNITED STATES PATENT OFFICE 2,646,848

AUTOMATIC HELICOPTER ROTOR STABILIZER

Arthur M. Young, Buffalo, N. Y., assignor to Bell Aircraft Corporation, Buffalo, N. Y.

Application February 18, 1947, Serial No. 729,207

7 Claims. (Cl. 170—160.13)

This invention relates to helicopter aircraft, and more particularly to improvements in flight stabilizing means for use in connection with rotors having stabilizing inertia arrangements therefor of the types disclosed in my prior Patents Nos. 2,384,516 and 2,368,698. As explained in my earlier patents, an inertia device in combination with a rotor may be arranged to provide stabilized flight; but the present invention relates to refinements and improvements over the basic arrangements disclosed and described in the prior art.

I have now determined that specifically in the see-saw type rotor arrangements lacking the features of the present invention there are tendencies for forces imposed against the rotor to feed back through the rotor control system so as to momentarily tip the stabilizing bar thereby combating intended pilot control effects.

For example, if no frictional resistance to tilting of the inertia device is employed, when the helicopter is in flight at moderate forward speed the plane of rotation of the inertia device is observed to tilt backwardly. This is explained by the fact that at such speed of flight the velocities of the airflow in the downwash of air through the rotor varies considerably from the front half to the rear half of the rotor disc. Since the rotor is articulately connected to the mast the rotor blades operate at all times under equal lift moments. Since the downwash velocities differ as explained hereinabove the torque drag on the blade in the rear half of the disc is greater than the torque drag on the blade in the front half of the disc. This inequality in drag on the rotor blades produces a net force directed sidewise on the hub. Since the rotor blades cone upwardly above the plane of pivoting of the hub to the mast, this net sidewise force causes a couple tending to rotate the whole rotor unit about the long axis of the blades; and this couple transmits through the control linkage to the rotating inertia means a force tending to tilt the plane of rotation of the latter backwardly. (The sidewise force results in tipping the inertia device plane rearwardly because of the 90° gyroscopic lag between the azimuthal position of a force imposed against a rotating inertia device and the azimuthal position of the resulting response.)

Also, it has been noticed that control arrangements lacking the features of the present invention usually provide relatively slow responses to maneuvering control adjustments by the pilot. I have now determined that the above recited undesirable effects may be corrected by providing means introducing resistance to tilting movements of the inertia means relative to the aircraft mast or frame. I have also determined that in order to obtain optimum results in accord with the present invention such resistance to tilting of the inertia means must be of non-elastic form, and should be applied to a degree commensurate with the velocity of application of the forces which are to be overcome.

Any inclination of the rotating inertia means, as viewed from externally of the aircraft, consists of oscillation of the inertia means upon its pivotal connection to the mast. If this inclination is unresisted the control is impaired. Non-elastic resistance has the effect of limiting this inclination. If too great resistance is used the inertia means tends to remain perpendicular to the mast and to keep the rotor also perpendicular to the mast, whereupon the aircraft would be unstable when hovering, for example.

Again, if the resistance to tilting of the inertia means is too slight any intended maneuver by the pilot will be resisted by the tendency of the inertia device to remain in its original plane of rotation, whereby response of the aircraft to pilot control operations for maneuvering purposes will be too slow. Therefore, a compromised degree of friction must be used so as to keep the craft stable as well as maneuverable. Still better results are achieved through having the friction resistance effects increase with the velocity of the force application. This results in low friction for stability and greater friction for intentional maneuvers in which case the relative inclination of the inertia device and the mast is large (and hence velocity of the pivoting of the inertia device is greater).

Therefore, in order to obtain both stability in hovering and rapidity in maneuvering, it is required to provide the resistance against tilting of the inertia means to be relatively slight when meeting forces tending to tilt the inertia means only slightly, and of greater degree when meeting forces tending to produce relatively great tilting movements thereof; and in any case it is required to avoid precessing of the plane of inertia means rotation, as distinguished from reducing it.

Therefore, it is a primary object of the present invention to provide an improved stabilizing and control system in helicopter aircraft and the like incorporating the improved stability and maneuvering control features referred to hereinabove.

Figure 2:
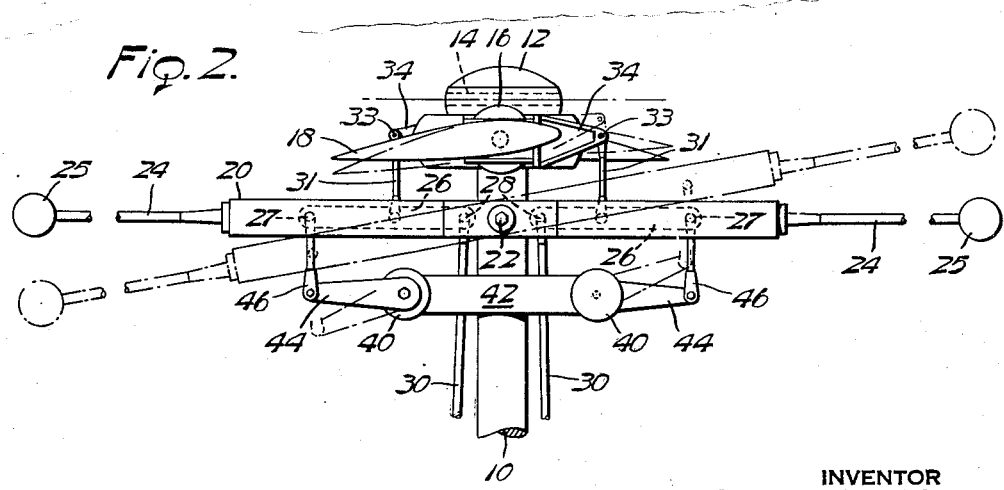

In the drawings:

Fig. 1 is a fragmentary underneath perspective view of a helicopter rotor and stabilizing bar control arrangement of the invention; and Fig. 2 is a fragmentary side elevational view thereof, illustrating diagrammatically the mode of operation.

The drawing illustrates the invention in conjunction with a helicopter aircraft having a generally vertical mast 10 mounting at its upper end the aircraft rotor hub 12 by means of a pivot arrangement 14 whereby the rotor hub is pivotable on the mast about an axis extending at right angles to the long axis of the rotor. Thus, the rotor is of the seesaw type as referred to in the art. The hub 12 is provided with diametrically opposed blade socket portions 16—16 which are rotatably mounted upon the body of the hub 12 to carry the rotor blade members 18—18 for individual blade pitch change adjustments; as for example in the manner of the blade mounting arrangement disclosed in my prior Patent No. 2,384,516 and in Fig. 7 of my prior Patent No. 2,368,698.

In the present drawing an inertia control means of the stabilizing bar type is employed and is illustrated to comprise a beam 20 which is pivoted to the mast 10 by means of a pivot connection 22 so as to be rockable relative to the mast about an axis extending parallel to the long axis of the rotor unit and at right angles to the axis of the rotor pivot device 14. Arms 24—24 extend from opposite ends of the frame 20 and carry weights 25—25 to provide the required masses at the ends of the stabilizer bar, as has been previously explained in my earlier patents. Pilot operable means is supplied in association with the stabilizing bar unit whereby the aircraft pilot may be given full maneuvering control of the aircraft as explained in my earlier patents referred to, and for this purpose in the case of the present specification the drawing is illustrated to include within each of the opposite ends of the frame 20 a rocker arm 26 which is pivotally connected at one end by means of a pin 27 to the frame 20 and at its other end by means of a pin 28 to the upper end of a corresponding pilot operable push-pull strut 30. Rotor blade pitch control links 31—31 are connected at their lower ends to the rocker arms 26—26 as by means of pins 32—32, and at their upper ends by means of pins 33—33 to horns 34—34 which extend from the blade root portions 16 at opposite sides of the hub 12.

Thus, whenever the mast 10 is tipped relative to the stabilizer bar unit, one of the rotor blades will be rotated so as to increase the pitch angle of the blade while the other blade is simultaneously rotated through the stabilizer bar linkage connections into a position of decreased angle of pitch as explained in my earlier patents referred to hereinabove, and as illustrated in Fig. 2 of the drawing herein.

To provide for pilot control of the rotor the struts 30—30 may be pivotally connected to any suitable control means such as for example the outer race of a Saturn ring (not shown) mounted to be universally rockable relative to the aircraft mast and freely rotatable relative thereto about the axis of the mast; such as is disclosed in my Patent 2,368,698. Consequently, it will be understood that as the mast rotates in response to driving action of the aircraft engine, the fly bar and rotor and control linkage mechanism will rotate therewith, while a pilot control means may be arranged to extend from the inner race of the Saturn ring into convenient reach of the aircraft pilot.

Thus, if for example the mast undergoes an inclination relative to the normal vertical attitude thereof, the fly bar nevertheless tends to preserve its initial horizontal plane of rotation due to its inertia. Since the Saturn ring is rigidly connected to the control handle and is thereby locked relative to the mast, it will partake of the inclination of the mast relative to the horizon. Such movement of the Saturn ring relative to the plane of rotation of the fly bar will cause the rockers 26—26 to oscillate accordingly about the fulcrums 27—27 which are substantially vertically stationary due to the inertia of the fly bar against shifting out of its initially horizontal plane of rotation. Consequently, the rockers will pivot the blades about their longitudinal axes, thereby feathering the rotor so as to cause it to track in a plane inclined with respect to the mast in such direction that the lift vector is directed so as to tend to restore the mast to a vertical attitude. Thus automatically stabilizing influences are generated in response to every upsetting tendency and without attention to the control system by the pilot.

If, however, the pilot manipulates his control handle so as to tilt the Saturn ring relative to the mast the connected linkage operates to cause the plane of the rotor to be tilted, whereby a thrust force tending to drive the aircraft horizontally in the desired direction will be developed.

As explained hereinabove in order to obtain optimum hovering stability and a sensitiveness of maneuvering control, a resistance to pivotal movements of the stabilizing bar relative to the mast must be employed such as a hydrodynamic damping unit as is indicated as at 40—40 in the drawing, although it is to be understood that the damping unit may be of any other type in lieu of the style which is specifically indicated in the drawing. Several types of hydraulic damping devices suitable for the purpose are currently manufactured such as for example the type disclosed in detail in U. S. Patent No. 2,173,372.

In any case, as illustrated in the drawing, the damping unit may comprise a pair of devices designated 40—40 which are shown mounted at opposite sides of the mast 10 by means of a bracket 42; the actuating arms portions 44—44 of the damping devices being pivotally connected to struts 46—36 which in turn extend into pivotal connections with the stabilizer frame 20, as by being coupled to the pins 27—27 thereon. Thus, any pivoting of the stabilizer bar frame 20 relative to the mast 10 will be accompanied by corresponding motions of the crank arms 44—44 relative to the damping unit casings. Thus, as explained hereinabove, if the forces tending to pivot the bar relative to the mast are relatively slight, the units 40—40 will generate only slight resistances or damping effects; while if the forces operating against the stabilizing bar tend to pivot it relatively violently, the units 40—40 operate instantaneously to counter such tendencies with maximum resistance effects (Fig. 2).

In lieu of the specific type of motion resistance device illustrated and described in detail hereinabove, I have used other means such as friction surfaces; dash-pot means; variable leverage mechanisms, and the like, to obtain the features of the present invention, and therefore it will be apparent to those skilled in the art that the invention is not so limited but that various changes may be made therein without departing from the spirit of the invention or the scope of the appended claims.

I claim:

1. In an aircraft, a body, a rotary member mounted on said body for rotation about a generally upright axis, blade means, means mounting said blade means on said rotary member for change of the effective incidence of said blade means, inertia means rotatable about a generally upright axis, means mounting said inertia means on said body for universal inclination relative thereto, means connecting said inertia means with said blade means to control the effective incidence of said blade means, and non-elastic friction damping means interconnecting said inertia means and said body and arranged to damp inclination movements of said inertia means relative to said body.

2. In an aircraft, a body, a rotary member, blade means, means mounting said blade means on said rotary member for change of the effective incidence of said blade means, inertia means carried by said rotary member and pivotable thereon, means connecting said inertia means with said blade means to control the effective incidence of said blade means, and non-elastic friction damping means interconnecting said inertia means and said rotary member and arranged to damp pivotal movements of said inertia means relative to said rotary member.

3. In an aircraft, an upright rotary member, blade means, means mounting said blade means on said rotary member for change of the effective incidence of said blade means, inertia means carried by said rotary member to be pivotable thereon about a longitudinal axis whereby said inertia means is mounted upon the aircraft for universal inclinations, means connecting said inertia means with said blade means to control the effective incidence of said blade means, a pilot operable control means interconnecting said blade means and said inertia means and adjustable to vary the relative inclination of the planes of rotation of said rotor and said inertia means, and non-elastic friction damping means interconnecting said inertia means and said rotary member and arranged to damp inclination movements of said inertia means relative to said member.

4. In an aircraft, a body, a rotary member mounted on said body for rotation about a generally upright axis, blade means, means mounting said blade means on said rotary member for change of the effective incidence of said blade means, inertia means pivoted to said rotary member about an axis parallel to a longitudinal axis of said blade means, means connecting said inertia means with said blade means to control the effective incidence of said blade means, and non-elastic friction damping means interconnecting said inertia means and said body and arranged to damp inclination movements of said inertia means relative to said body.

5. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said rotary member for pivoting relative thereto, means connecting said inertia means with said blade means to control the effective incidence of said blade means, a pilot operable control means connecting to said blade means and said inertia means and adjustable to vary the relative inclination of the planes of rotation of said rotor and of said inertia means, and non-elastic friction damping means interconnecting said inertia means and said rotary member and arranged to damp inclination movements of said inertia means relative to said member.

6. In an aircraft, an upright rotary member, blade means, means mounting said blade means on said rotary member for change of the effective incidence of said blade means, inertia means carried by said rotary member to be pivotable thereon, means connecting said inertia means with said blade means to control the effective incidence of said blade means, a pilot operable control means connecting to said inertia means and adjustable to vary the inclination of the plane of rotation of said inertia means, and non-elastic friction damping means interconnecting said inertia means and said rotary member and arranged to damp inclination movements of said inertia means relative to said member.

7. In an aircraft, a body, a rotary member mounted on said body for rotation about a generally upright axis, blade means, means mounting said blade means on said rotary member for change of the effective incidence of said blade means, inertia means rotatable about a generally upright axis, means mounting said inertia means on said body for universal inclination relative thereto, means connecting said inertia means with said blade means to control the effective incidence of said blade means, a pilot operable control means interconnecting said blade means and said inertia means and adjustable to vary the relative inclination of the planes of rotation of said rotor and said inertia means, and friction type damping means interconnecting said inertia means and said body and arranged to damp inclination movements of said inertia means relative to said body.

ARTHUR M. YOUNG.

References Cited in the file of this patent

UNITED STATES PATENTS

| Number | Name | Date |
|---|---|---|
| 1,800,470 | Oehmichen | Apr. 14, 1931 |
| 2,242,806 | Wunsch | May 20, 1941 |
| 2,299,117 | Von Manteuffel | Oct. 20, 1942 |
| 2,368,698 | Young | Feb. 6, 1945 |
| 2,384,516 | Young | Sept. 11, 1945 |
| 2,427,939 | Woods | Sept. 23, 1947 |

FOREIGN PATENTS

| Number | Country | Date |
|---|---|---|
| 545,187 | Great Britain | May 14, 1942 |